(12) United States Patent
Miyauchi et al.

(10) Patent No.: US 12,303,931 B2
(45) Date of Patent: May 20, 2025

(54) FASTENER PAINTING SYSTEM AND METHOD OF PAINTING FASTENER

(71) Applicant: SUBARU CORPORATION, Tokyo (JP)

(72) Inventors: Tomohiro Miyauchi, Tokyo (JP); Yohei Matsumoto, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 224 days.

(21) Appl. No.: 17/819,024

(22) Filed: Aug. 11, 2022

(65) Prior Publication Data
US 2023/0084296 A1    Mar. 16, 2023

(30) Foreign Application Priority Data

Sep. 13, 2021   (JP) .................................. 2021-148649

(51) Int. Cl.
*B05C 5/02* (2006.01)
*B05C 11/11* (2006.01)
*B05D 1/26* (2006.01)

(52) U.S. Cl.
CPC .......... *B05C 5/0208* (2013.01); *B05C 5/0225* (2013.01); *B05C 11/11* (2013.01); *B05D 1/26* (2013.01)

(58) Field of Classification Search
None
See application file for complete search history.

(56) References Cited

U.S. PATENT DOCUMENTS

| | | | | |
|---|---|---|---|---|
| 4,637,531 A | * | 1/1987 | Olsson | B65D 47/286 222/327 |
| 6,833,157 B2 | * | 12/2004 | Mandai | G03C 1/74 118/62 |
| 7,112,348 B2 | * | 9/2006 | Mandai | B05C 11/1039 118/410 |

(Continued)

FOREIGN PATENT DOCUMENTS

| EP | 3 501 792 A1 | 6/2019 |
|---|---|---|
| EP | 3 797 875 A1 | 3/2021 |

(Continued)

OTHER PUBLICATIONS

Extended European Search Report mailed Mar. 3, 2023 in European Patent Application No. 22 189 548.5 (5 pages).

*Primary Examiner* — Jethro M. Pence
(74) *Attorney, Agent, or Firm* — Smith, Gambrell & Russell, LLP

(57) ABSTRACT

A fastener painting system is a system for painting a head of a fastener. The system includes: a cup for covering the head of the fastener by contacting an edge of the cup with a surface of the object; a supply system; a liquid discharging system; and a moving mechanism. The cup has a cavity for being filled up with paint. The supply system is configured to store the paint and supply the paint into the cavity of the cup. The liquid discharging system is configured to discharge surplus paint in the cavity out of the cup. The moving mechanism is configured to change a position of the cup relative to the object. The cup has a supply port for supplying the paint into the cavity, a vent for discharging air in the cavity out, and a liquid discharging port for discharging the surplus paint out of the cavity.

16 Claims, 9 Drawing Sheets

(56) References Cited

U.S. PATENT DOCUMENTS

| | | | |
|---|---|---|---|
| 8,397,662 B2* | 3/2013 | Herre | B25J 9/0084 |
| | | | 901/43 |
| 8,574,365 B2* | 11/2013 | Wagner | B05C 11/1039 |
| | | | 118/668 |
| 8,651,046 B1* | 2/2014 | Davancens | B05C 5/0212 |
| | | | 901/41 |
| 9,968,962 B2 | 5/2018 | Weinmann | B05C 17/015 |
| 10,086,402 B2* | 10/2018 | Tomuta | A46B 11/063 |
| 10,105,725 B2* | 10/2018 | Tomuta | B05C 5/0216 |
| 10,408,251 B2* | 9/2019 | Pillay | B05C 17/00516 |
| 10,458,455 B2* | 10/2019 | Pillay | B64D 45/02 |
| 10,458,456 B2* | 10/2019 | Pillay | F16B 33/004 |
| 10,486,343 B2 | 11/2019 | Pringle, IV | |
| 11,027,461 B2 | 6/2021 | Pringle, IV | |
| 11,192,137 B2* | 12/2021 | Shang | H04N 13/204 |
| 11,260,412 B2* | 3/2022 | Tomuta | B05B 13/0431 |
| 11,426,750 B2* | 8/2022 | Ikushima | B05C 5/0216 |
| 11,465,166 B2* | 10/2022 | Wada | B05C 5/02 |
| 11,498,092 B2* | 11/2022 | Fliess | B05C 5/001 |
| 11,931,910 B2* | 3/2024 | Oridate | B25J 9/163 |
| 11,951,635 B1* | 4/2024 | Oridate | B25J 15/0019 |
| 11,969,751 B2* | 4/2024 | Shang | H04N 23/54 |
| 2013/0171360 A1* | 7/2013 | Herre | B05B 16/00 |
| | | | 427/427.3 |
| 2014/0234011 A1* | 8/2014 | Tomuta | B05C 5/0208 |
| | | | 401/289 |
| 2014/0312148 A1* | 10/2014 | Jurado Blazquez | B05C 17/00516 |
| | | | 239/590.3 |
| 2015/0064357 A1* | 3/2015 | Tomuta | A46B 11/063 |
| | | | 401/287 |
| 2016/0325489 A1* | 11/2016 | Guirguis | B05C 11/023 |
| 2017/0239672 A1* | 8/2017 | Toh | B05B 15/65 |
| 2018/0009000 A1 | 1/2018 | Shang et al. | |
| 2018/0333732 A1* | 11/2018 | Tomuta | B05C 1/02 |
| 2018/0361403 A1* | 12/2018 | Grund | B05B 1/3033 |
| 2019/0143364 A1* | 5/2019 | Pringle-Iv | E04F 21/1655 |
| | | | 401/48 |
| 2019/0195265 A1 | 6/2019 | Pillay | |
| 2020/0039119 A1* | 2/2020 | Pringle, IV | B29C 39/10 |
| 2021/0095708 A1 | 4/2021 | Dumas et al. | |
| 2022/0080454 A1* | 3/2022 | Shang | B25J 9/1697 |
| 2022/0324584 A1* | 10/2022 | Roper | F16B 41/00 |
| 2023/0182317 A1* | 6/2023 | Matsumoto | B25J 9/1651 |
| | | | 222/52 |
| 2023/0405818 A1* | 12/2023 | Oridate | B25J 9/1694 |
| 2024/0116181 A1* | 4/2024 | Oridate | B25J 9/162 |

FOREIGN PATENT DOCUMENTS

| | | |
|---|---|---|
| JP | H07-39960 U | 7/1985 |
| JP | 2016-514036 A | 5/2016 |
| JP | 2018-161645 A | 10/2018 |

* cited by examiner

FASTENER PAINTING SYSTEM AND METHOD OF PAINTING FASTENER

CROSS REFERENCES TO RELATED APPLICATIONS

This application is based upon and claims the benefit of priority from Japanese Patent Application No. 2021-148649, filed on Sep. 13, 2021; the entire contents of which are incorporated herein by reference.

FIELD

Implementations described herein relate generally to a fastener painting system and a method of painting a fastener.

BACKGROUND

After painted parts are assembled with fasteners, such as rivets, it is necessary to paint the heads of the fasteners for rustproof and the like in many cases. In particular, a rivet used by being deformed, such as a rivet whose head is formed by being swaged, cannot be painted in advance. Accordingly, an apparatus for sealing and painting a head of a fastener is proposed (for example, refer to Japanese Patent Application Publication JP2018-161645 A and Japanese Utility Model Application Publication JPH07-039960 A). Meanwhile, an apparatus for painting a fixing tool, such as a bracket, using a brush is also proposed (for example, refer to Japanese Patent Application Publication JP2016-514036 A).

However, aircraft parts especially require high-quality paint application under conditions that the film thickness of paint applied to the head of a fastener must be within an acceptable range, that excess paint must not be attached to a painted part, and the like. In addition, an aircraft part may have a size of several meters, which requires equipment for conveying the aircraft part to a painting booth or the like as well as leads to the increase in a manufacture period if the aircraft part is conveyed. Therefore, it is desired to allow painting the head of each fastener promptly in a work area, in which aircraft parts are assembled, or near the work area. For that reason, in case of aircraft parts, the head of each fastener is manually painted with a brush in most cases although the aircraft parts have been assembled with a number of rivets.

Accordingly, an object of the present invention is to allow automatically painting the head of a fastener with high quality by a simple configuration.

SUMMARY OF THE INVENTION

In general, according to one implementation, a fastener painting system is a system for painting a head of a fastener. The system includes: a cup for covering the head of the fastener by contacting an edge of the cup with a surface of the object; a supply system; a liquid discharging system; and a moving mechanism. The cup has a cavity for being filled up with paint. The supply system is configured to store the paint and supply the paint into the cavity of the cup. The liquid discharging system is configured to discharge surplus paint in the cavity out of the cup. The moving mechanism is configured to change a position of the cup relative to the object. The cup has a supply port for supplying the paint into the cavity, a vent for discharging air in the cavity out, and a liquid discharging port for discharging the surplus paint out of the cavity.

Further, according to one implementation, a method of painting a fastener by which a painted product is produced by painting a head of the fastener attached to an object includes: covering the head of the fastener with a cup, having a cavity for being filled up with paint, a supply port for supplying the paint into the cavity, a vent for discharging air in the cavity out, and a liquid discharging port for discharging surplus paint out of the cavity, by changing a position of the cup relative to the object by a moving mechanism and contacting an edge of the cup with a surface of the object; supplying the paint into the cavity through the supply port while discharging the air in the cavity out through the vent; and discharging the surplus paint in the cavity out through the liquid discharging port.

DETAILED DESCRIPTION

A fastener painting system and a method of painting a fastener according to implementations of the present invention will be described with reference to the accompanying drawings.

(First Implementation)
(Structure and Function of Fastener Painting System)

Figure 1:
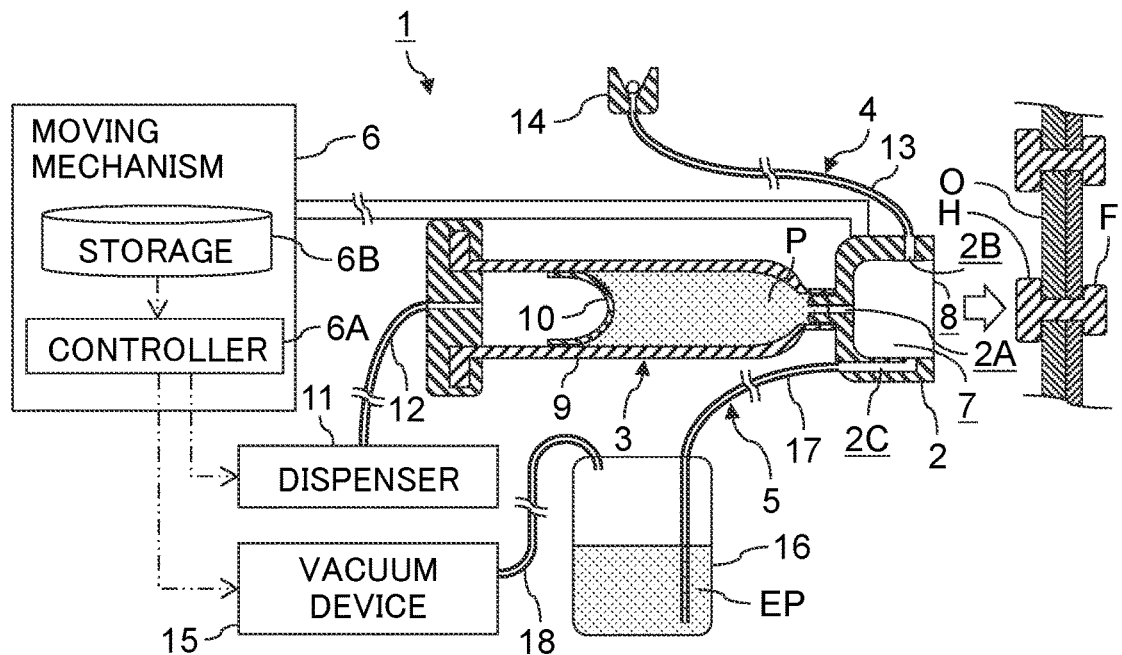
FIG. 1 shows structure of a fastener painting system 1 according to the first implementation of the present invention.

FIG. 1 shows structure of a fastener painting system 1 according to the first implementation of the present invention.

The fastener painting system 1 is a system for automatically painting a head H of a fastener F, such as a rivet or a bolt, attached to an object O, such as an aircraft structural object. The paint application for partially repairing a target to be painted is referred to as touch-up. Therefore, it can also be said that the fastener painting system 1 is an automatic touch-up system of the head H of the fastener F. The head H of the fastener F to be automatically painted by the fastener painting system 1 may be the formed head of a rivet which has been swaged as well as the head of a bolt or the made head of a rivet which is not swaged.

The fastener painting system 1 can be composed of a cup 2 for covering the head H of the fastener F, a supply system 3 for supplying paint P into the cup 2, an exhaust system 4 for discharging air in the cup 2 out, a liquid discharging system 5 for discharging surplus paint EP in the cup 2 out of the cup 2, and a moving mechanism 6 for changing the relative position of the cup 2 to the object O.

The cup 2 has a cavity 7 for being filled up with the paint P inside, and forms an opening 8 so that the head H of the fastener F can be inserted into the cavity 7. Accordingly, the head H of the fastener F can be covered by the cup 2 by contacting the edge of the cup 2 with the surface of the object O. In addition, the cup 2 has a supply port 2A for supplying the paint P from the supply system 3 into the cavity 7, a vent 2B for discharging air in the cavity 7 by the exhaust system 4, and a liquid discharging port 2C for discharging the surplus paint EP out of the cavity 7 by the liquid discharging system 5.

The supply system 3 can be composed of a syringe 9 for storing the paint P, a plunger 10 disposed in the syringe 9, and a dispenser 11 for discharging the paint P out of the syringe 9 by supplying air to push out the plunger 10, for example.

The syringe 9 has a cylindrical vessel for discharging the paint P out through the outlet formed at the tip while storing the paint P. The plunger 10 is disposed inside the syringe 9. The space, on the outlet side of the syringe 9, sealed with the plunger 10 is filled up with the paint P. Meanwhile, supplying air to the space, on the inlet side of the syringe 9, segmented with the plunger 10 can push out the plunger 10 toward the paint P side by air pressure.

The dispenser 11 is a liquid fixed-quantity discharging apparatus which controls the quantity of the paint P discharged out of the syringe 9 by supplying air of an appropriate quantity into the space on the inlet side of the syringe 9 segmented with the plunger 10. Therefore, the dispenser 11 is coupled to the inlet of the syringe 9 with an air tube 12.

The outlet of the syringe 9 is coupled to the supply port 2A of the cup 2. Therefore, the paint P of a desired quantity can be supplied into the cavity 7 of the cup 2 from the syringe 9 under the control by the dispenser 11. Note that, a commercially available luer-lock type syringe has an internal thread at the tip. Therefore, a luer-lock type syringe can be used as the syringe 9 while an external thread can be formed on the supply port 2A of the cup 2. Thereby, the syringe 9 can be fixed to the cup 2 simply and stably.

The exhaust system 4 is provided in order to discharge the air in the cavity 7 of the cup 2 out at the time of supplying the paint P from the syringe 9 into the cavity 7. The exhaust system 4 can be composed of an air tube 13 through which air can pass. The one end of the air tube 13 is coupled to the vent 2B of the cup 2. A valve 14 for preventing the back flow of air can be coupled to the other end of the air tube 13. Although a valve opened and closed by control signals, such as an electromagnetic valve, may be used as the valve 14, using a check valve for which no control signals are required can simplify the configuration of the valve 14.

The liquid discharging system 5 discharges the surplus paint EP in the cavity 7 of the cup 2 out through the liquid discharging port 2C of the cup 2. What is necessary to discharge the surplus paint EP from the cup 2 is to suck the surplus paint EP in the cavity 7. For that purpose, the liquid discharging system 5 can be composed of a vacuum device 15, such as a vacuum pump or an ejector, and a discharged liquid trap 16.

The discharged liquid trap 16 is a tank for storing the surplus paint EP collected from the cup 2, and keeps the airtightness. In the discharged liquid trap 16, the layer of the surplus paint EP and the layer of air are formed due to the weight difference. The liquid discharging port 2C of the cup 2 is coupled to the discharged liquid trap 16 with a liquid discharging tube 17 while the discharged liquid trap 16 is coupled to the vacuum device 15 with an air tube 18.

More specifically, the inlet of the liquid discharging tube 17 is coupled to the liquid discharging port 2C of the cup 2 while the outlet of the liquid discharging tube 17 is disposed so that the outlet of the liquid discharging tube 17 may open in the layer of the surplus paint EP. Meanwhile, the inlet of the air tube 18 is disposed so that the inlet of the air tube 18 may open in the layer of air while the outlet of the air tube 18 is coupled to the vacuum device 15. Accordingly, when the vacuum device 15 is operated, the air is sucked from the layer of air in the discharged liquid trap 16 and the pressure in the discharged liquid trap 16 is decreased, and thereby the surplus paint EP can be sucked through the liquid discharging port 2C of the cup 2.

When the cavity 7 of the cup 2 is filled up with the paint P, a part of the paint P may flow into the air tube 13 for discharging air. Therefore, it is desirable to suck the surplus paint EP, which flowed into the air tube 13 for discharging air, through the liquid discharging tube 17. As a result of tests using a prototype, it has been confirmed that the surplus paint EP, which flowed into the air tube 13 for discharging air, can be sucked at the time of discharging the surplus paint EP out of the cup 2 more satisfactorily in a case of closing the valve 14 to block the inflow of the atmospheric air into the air tube 13 for discharging air than a case of exposing the end on the atmosphere side of the air tube 13 for discharging air, to the atmosphere. Therefore, coupling the valve 14, such as a check valve, to the end on the atmosphere side of the air tube 13 for discharging air has a merit mainly in the point of removing the surplus paint EP which flowed into the air tube 13 for discharging air.

The moving mechanism 6 positions the cup 2 relatively to the head H of the fastener F to be painted. That is, at least one of the cup 2 and the object O can be moved by the moving mechanism 6. The moving mechanism 6 can be composed of at least one drive shaft for moving at least one of the cup 2 and the object O. For example, the moving mechanism 6 can be composed of at least one machine element which allows parallel movement in orthogonal three axis directions and/or rotation, such as tilting, around a desired axis, similarly to drive shafts for moving the spindle of a machine tool. Alternatively, the moving mechanism 6 may be composed of an articulated robot which is cheaper and can be installed in an assembly factory or the like more easily than drive shafts for a machine tool since positioning accuracy required for the cup 2 is low compared with that for machining or the like.

Figure 2:
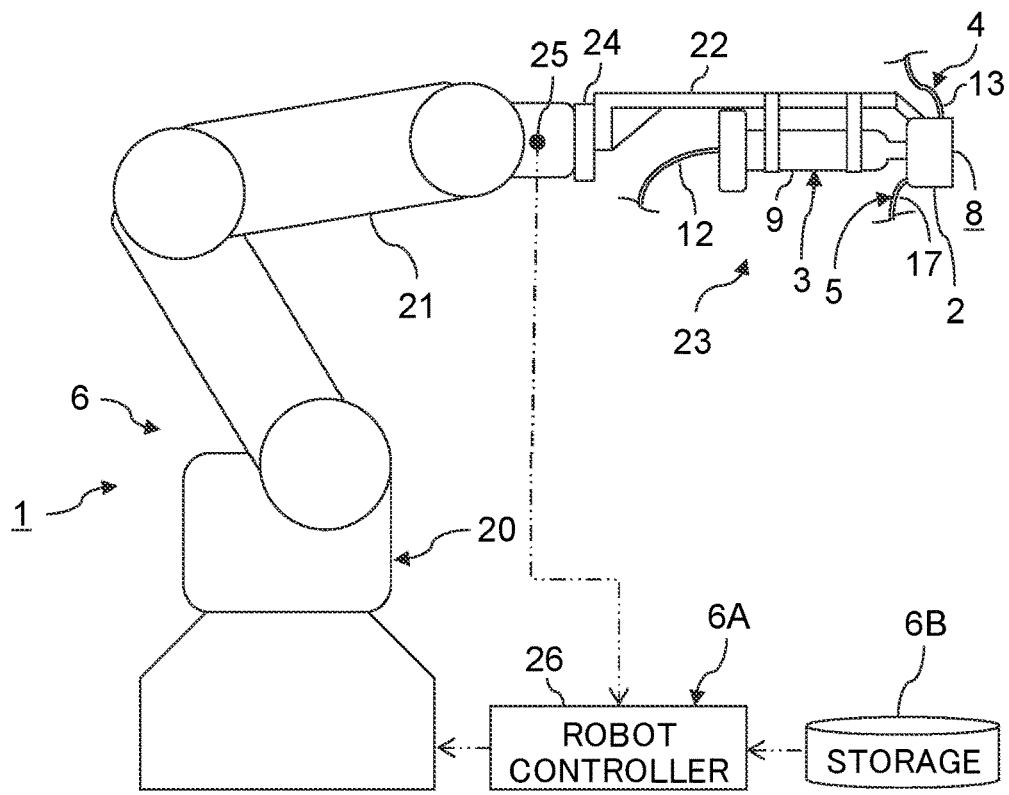
FIG. 2 shows an example of using an articulated robot, having an arm, as the moving mechanism shown in FIG. 1.
Figure 3:
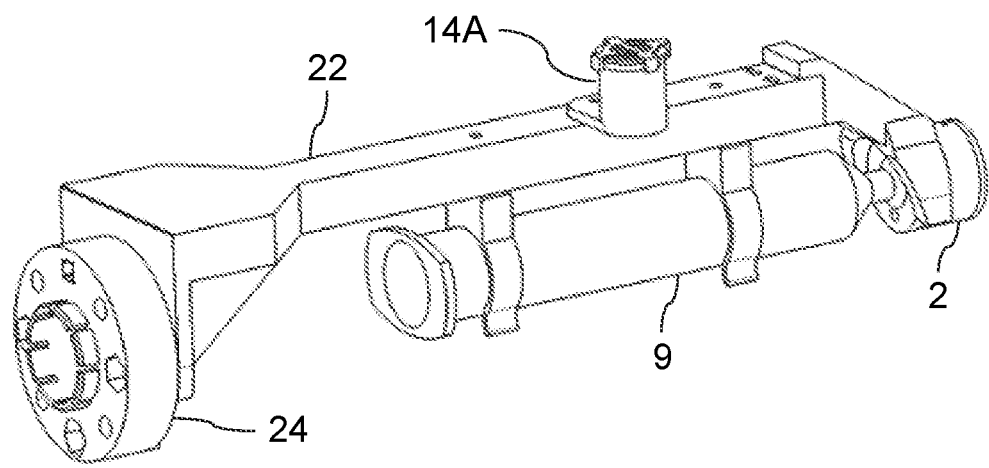
FIG. 3 is a perspective view showing an example of detailed structure of a holder, shown in FIG. 2, for fixing the cup and the syringe to the arm of the articulated robot.

FIG. 2 shows an example of using an articulated robot 20, having an arm 21, as the moving mechanism 6 shown in FIG. 1 while FIG. 3 is a perspective view showing an example of detailed structure of a holder 22, shown in FIG. 2, for fixing the cup 2 and the syringe 9 to the arm 21 of the articulated robot 20.

As exemplified by FIG. 2, the cup 2 can be moved by the arm 21 of the articulated robot 20 having typical cantilever structure. In that case, it is realistic to attach not only the cup 2 but the syringe 9, united to the cup 2, to the end of the arm 21 as an end effector 23. Note that, the arm 21 of the articulated robot 20 is also called a manipulator.

For that purpose, the cup 2 and the syringe 9 coupled to each other with a luer-lock or the like can be held by the fitting type holder 22 from and to which the cup 2 and the syringe 9 can be simply detached and attached with snap fits, as exemplified by FIG. 3. A flange 24 for fixing the holder 22 to the arm 21 of the articulated robot 20 is formed at the end of the holder 22. Accordingly, attachment, detachment and exchange of the cup 2 and the syringe 9 to and from the holder 22 fixed to the arm 21 with the flange 24 become easy.

In the example shown in FIG. 3, a check valve 14A is also fixed to the holder 22 since the check valve 14A has such a size and weight that can be supported by the arm 21. Accordingly, the distance between the check valve 14A and the cup 2 can be made constant, and thereby the risk of an interference of the air tube 13 for discharging air can be reduced at the time of moving the arm 21 of the articulated robot 20.

The moving mechanism 6 has a controller 6A and storage 6B regardless of whether the moving mechanism 6 is composed of the articulated robot 20. The controller 6A drives the moving mechanism 6 while the storage 6B stores NC (Numerical Control) programs of the moving mechanism 6, and the like. The positioning of the cup 2 relative to the head H of the fastener F requires the positional information on the head H of the fastener F.

Accordingly, the control program of the moving mechanism 6 including 3D (Three Dimensional) positional information on the targeted heads H of the fasteners F for touch-up can be stored in the storage 6B. Thereby, the controller 6A can control the moving mechanism 6 according to the control program of the moving mechanism 6, including the positional information on the heads H of the fasteners F, stored in the storage 6B so that the cup 2 can be positioned relatively to the head H of the fastener F.

In order to prevent the paint P from leaking from a clearance between the cup 2 and the surface of the object O in the state where the cavity 7 in the cup 2 has been filled up with the paint P, it is important to closely attach the edge of the cup 2 to the surface of the object O around the head H of the fastener F. Therefore, painting the head H of the fastener F requires positioning of the cup 2 in the 2D (Two Dimensional) directions on a plane vertical to the length direction of the fastener F so that the position of the cavity 7 and the opening 8 of the cup 2 may become a position away from the position of the head H of the fastener F in the length direction of the fastener F, and subsequent positioning of the cup 2 in the length direction of the fastener F.

The positioning of the cup 2 in the length direction of the fastener F is that the position of the cup 2 is determined so that the edge of the cup 2 may be closely attached to the surface of the object O to an extent that the paint P does not leak from the gap between the cup 2 and the surface of the object O in the state where the cavity 7 in the cup 2 has been filled up with the paint P. Therefore, the positioning of the cup 2 in the length direction of the fastener F requires higher accuracy than the positioning of the cup 2 in directions vertical to the length direction of the fastener F.

The typical arm 21 of the articulated robot 20 includes force sensors 25 as standard equipment. Accordingly, whether the edge of the cup 2 has contacted to the surface of the object O can be determined based on the reaction force from the surface of the object O to the cup 2 measured by the force sensors 25 in case of using the articulated robot 20 as the moving mechanism 6. More specifically, when the reaction force from the surface of the object O to the cup 2 in the length direction of the fastener F, measured by the force sensors 25, has reached a threshold value, it can be determined that the edge of the cup 2 has contacted to the surface of the object O, and the positioning of the cup 2 in the length direction of the fastener F can be completed.

In that case, a robot controller 26 of the articulated robot 20 which is the controller 6A of the moving mechanism 6 can be provided with a function to acquire, from the force sensors 25, the reaction force from the surface of the object O to the cup 2 while driving the arm 21 for making the cup 2 approach to the surface of the object O by moving the cup 2 in the length direction of the fastener F as well as a function to stop the driving of the arm 21 and the movement of the cup 2 in the length direction of the fastener F when the reaction force acquired from the force sensors 25 has reached a threshold value.

As a matter of course, also when the articulated robot 20 is not used as the moving mechanism 6, whether the edge of the cup 2 has contacted to the surface of the object O can be determined similarly by disposing at least one force sensor.

When the cup 2 has been positioned relatively to the head H of the fastener F, it is necessary to supply the paint P into the cavity 7 of the cup 2 which covers the head H of the fastener F while it is appropriate to start to supply the paint P at timing after the cup 2 has been positioned. Therefore, it is necessary to interlock the supply of the paint P into the cup 2 by the supply system 3 with the movement of the cup 2 by the moving mechanism 6.

Accordingly, the controller 6A, such as the robot controller 26, of the moving mechanism 6 can be provided with a function to output, to the dispenser 11, control signals for instructing an operation start, an operation stop, and the like of the dispenser 11. The standard dispenser 11 has a function to set up and control discharging conditions, such as a flow quantity, a flow rate and pressure, of liquid to be discharged out. Therefore, as long as appropriate discharging conditions including a flow quantity and discharging pressure of the paint P determined by tests or the like are preset in the dispenser 11, the paint P can be discharged from the syringe 9 into the cavity 7 in the cup 2 under the appropriate discharging conditions only by outputting a trigger signal for switching ON and OFF of the dispenser 11 from the controller 6A of the moving mechanism 6.

The total quantity of the paint P, which should be discharged into the cavity 7 in the cup 2, larger than the capacity of the cavity 7 leads to avoiding inconvenience that air remains in the cavity 7 in the cup 2. That is, it is desirable to configure the supply system 3 to supply, into the cavity 7 in the cup 2, the paint P of more quantity than the capacity of the cavity 7.

Accordingly, the controller 6A, such as the robot controller 26, can be provided with a function to estimate the quantity of the paint P discharged into the cavity 7 in the cup 2, based on the flow quantity of the discharged paint P and the operating time of the dispenser 11, and a function to switch the operating state of the dispenser 11 off by outputting an operation stop signal to the dispenser 11 when it is determined that the paint P of a predetermined quantity has been supplied into the cavity 7 in the cup 2.

Alternatively, the dispenser 11 may estimate the quantity of the paint P discharged into the cavity 7 in the cup 2, based on the flow quantity of the discharged paint P and the operating time of the dispenser 11. In this case, the dispenser 11 may be configured to autonomously switch the operating state off when it is determined that the paint P of a predetermined quantity has been supplied into the cavity 7 in the cup 2. In that case, the dispenser 11 may be configured to notify the controller 6A, such as the robot controller 26, of the operating state of the dispenser 11 which has been switched off.

When the cavity 7 in the cup 2 has been filled up with the paint P, the head H of the fastener F is dipped in the paint P inside the cup 2, and thereby the effect that the paint P is applied to the head H of the fastener F can be attained. After that, the vacuum device 15 of the liquid discharging system 5 is operated, and thereby the paint P in the cavity 7 which has not been attached to the head H of the fastener F is discharged as the surplus paint EP through the liquid discharging port 2C.

Therefore, painting conditions of the head H of the fastener F also include the pressure of the surplus paint EP and a waiting period after the cavity 7 in the cup 2 has been filled up with the paint P until discharging the surplus paint EP in the cavity 7 is started, besides discharging conditions of the paint P into the cavity 7 in the cup 2 by the supply system 3. These painting conditions can be also previously determined appropriately by tests and the like, similarly to discharging conditions of the paint P into the cavity 7 in the cup 2.

The waiting period in the state where the cavity 7 in the cup 2 has been filled up with the paint P is a period after an operation of the dispenser 11 has been switched off until the vacuum device 15 operates. Meanwhile, the pressure of the surplus paint EP can be set up as an operating condition of the vacuum device 15.

Accordingly, the controller 6A of the moving mechanism 6, such as the robot controller 26, can be provided with a function to output, to the vacuum device 15, control signals for instructing an operation start, an operation stop, and the like of the vacuum device 15. Thereby, the waiting period in the state where the cavity 7 in the cup 2 has been filled up with the paint P can be controlled by outputting a trigger signal, for starting an operation, from the controller 6A, such as the robot controller 26, to the vacuum device 15 at the time when an appropriate period has passed after an operation of the dispenser 11 has been switched off.

Thus, painting conditions including the discharging flow quantity of the paint P, the discharging pressure of the paint P, the total quantity of the paint P to be discharged, the waiting period after the paint P has been discharged out, and the pressure of the surplus paint EP can be adjusted by appropriately setting up and controlling operating conditions of the dispenser 11 and operating conditions of the vacuum device 15. Therefore, setting these painting conditions appropriately makes it possible to attach the paint P all over the head H of the fastener F as well as make desirable the film thickness of the paint P attached to the head H of the fastener F. That is, the film thickness of the paint P attached to the head H of the fastener F can be adjusted.

Next, examples of detailed structure of the cup 2 will be described.

Figure 4:
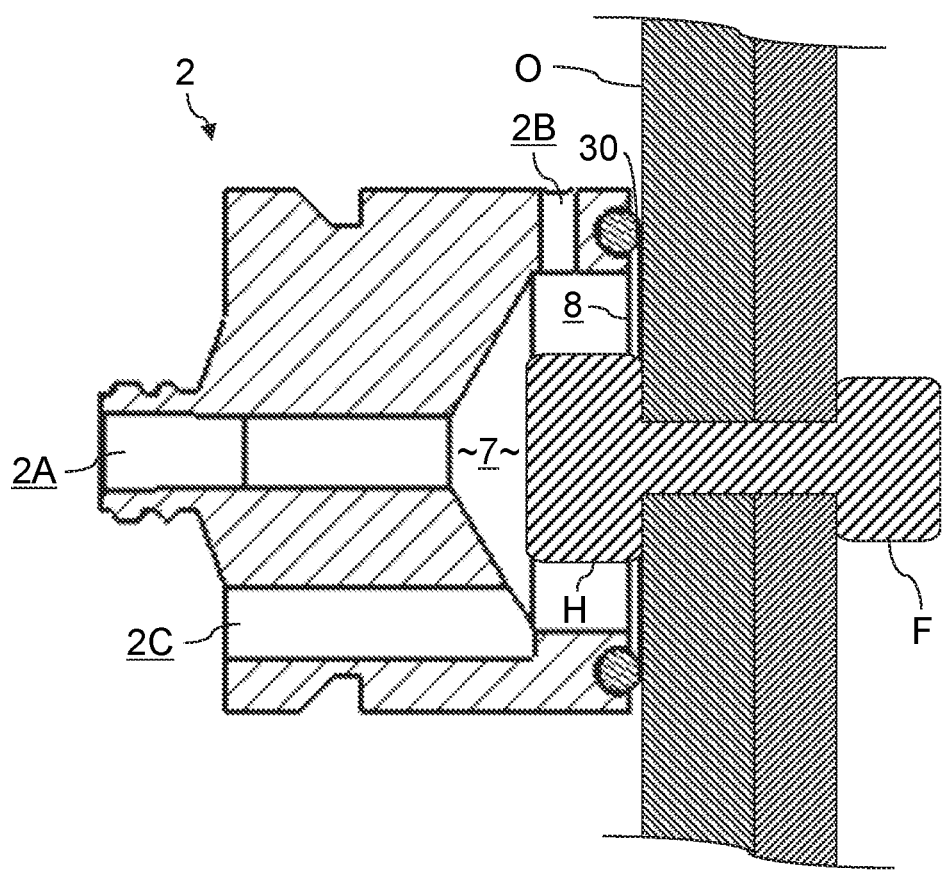
FIG. 4 is a longitudinal sectional view showing the first example of structure of the cup shown in FIGS. 1 to 3.
Figure 5:
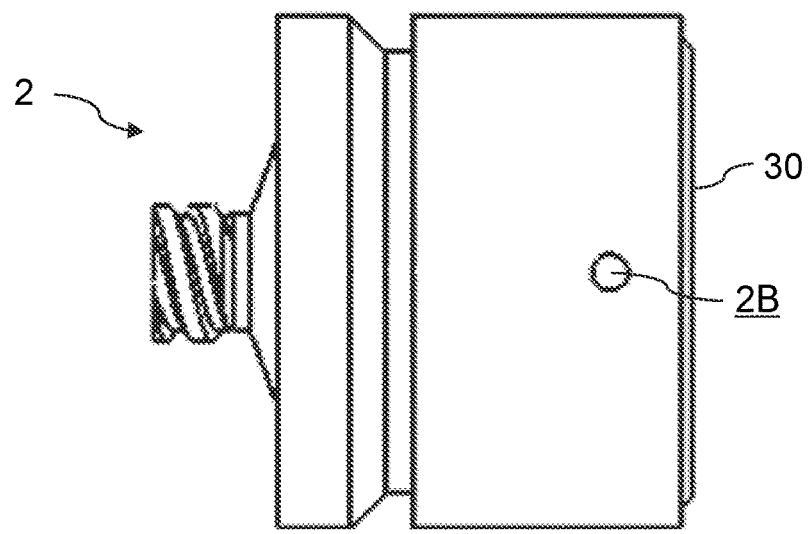
FIG. 5 is a top view of the cup shown in FIG. 4.

FIG. 4 is a longitudinal sectional view showing the first example of structure of the cup 2 shown in FIGS. 1 to 3. FIG. 5 is a top view of the cup 2 shown in FIG. 4.

As the first example of structure exemplified by FIG. 4 and FIG. 5, the cup 2 has the cavity 7 for being filled up with the paint P, and the opening 8 for inserting the head H of the fastener F into the cavity 7. The circumference of the opening 8 forms the edge of the cup 2 to be contacted to the surface of the object O. In the example shown in FIG. 4 and FIG. 5, the form of the opening 8 is circular. Therefore, the edge of the cup 2 is annular.

In addition, the cup 2 has the supply port 2A for supplying the paint P into the cavity 7, the vent 2B for discharging air out of the cavity 7, and the liquid discharging port 2C for discharging the surplus paint EP out of the cavity 7, as mentioned above. In the example shown in FIG. 4 and FIG. 5, an external thread is formed on the outer circumference of the cylindrical portion which forms the supply port 2A so that the cup 2 can be coupled to the tip of a luer-lock type syringe.

The cup 2 may be made of a desired material, such as a resin or a metal, as long as necessary strength can be secured. Therefore, the cup 2 is realistically rigid.

Meanwhile, it is desirable to prevent the paint P from leaking from the gap between the edge of the cup 2 and the surface of the object O in the state where the cavity 7 in the cup 2 has been filled up with the paint P, from a viewpoint of lightening a cleaning task. For that purpose, it is desirable that at least a part of the edge of the cup 2 which is brought in contact with the surface of the object O is made of an elastic body instead of a rigid body, from a viewpoint of closely attaching the edge of the cup 2 to the surface of the object O more certainly.

Accordingly, an O ring 30 can be attached to the edge of the cup 2 formed around the opening 8, as exemplified by FIG. 4 and FIG. 5. Thereby, the edge of the cup 2 formed with the O ring 30 can be closely attached on the surface of the object O.

In addition, disposing the object O and the cup 2 so that the head H of the fastener F may be covered with the cup 2 in the state where the opening 8 of the cup 2 is faced in an almost horizontal direction, i.e., disposing the object O so that the head H of the fastener F may project from the surface of the object O in an almost horizontal direction makes it possible to dispose the vent 2B for discharging air out of the cavity 7 at the highest position and to dispose the liquid discharging port 2C for discharging the surplus paint EP out of the cavity 7 at the lowest position.

More specifically, the position of the vent 2B can be determined so that the height of the vent 2B opening in the cavity 7 of the cup 2 may become the highest in the cavity 7 while the position of the liquid discharging port 2C can be determined so that the height of the liquid discharging port 2C opening in the cavity 7 of the cup 2 may become the lowest in the cavity 7, in a case where the normal direction of the plane on which the edge of the cup 2 lies is made horizontal.

In that case, the air remaining in the cavity 7 of the cup 2 can be gradually moved upward, and thereby the air can be certainly discharged out through the vent 2B at the highest position since the paint P accumulates in the cavity 7 gradually from the lower portion by gravity while the paint P is being discharged into the cavity 7. That is, the air can be prevented from remaining in the cavity 7 of the cup 2 after the cavity 7 of the cup 2 has been filled up with the paint P. As a result, it becomes possible to apply the paint P all over the head H of the fastener F.

On the other hand, when the surplus paint EP is discharged out of the cavity 7 of the cup 2, it becomes possible to certainly discharge the surplus paint EP, going below by gravity, through the liquid discharging port 2C at the lowest position. That is, the surplus paint EP can be prevented from remaining in the cavity 7 of the cup 2 after the discharging process of the surplus paint EP out of the cavity 7 of the cup 2 has been completed. As a result, cleaning of the cup 2 becomes easy as well as the cavity 7 of the cup 2 can be always filled up with the fresh paint P when the heads H of the fasteners F are sequentially painted.

Figure 6:
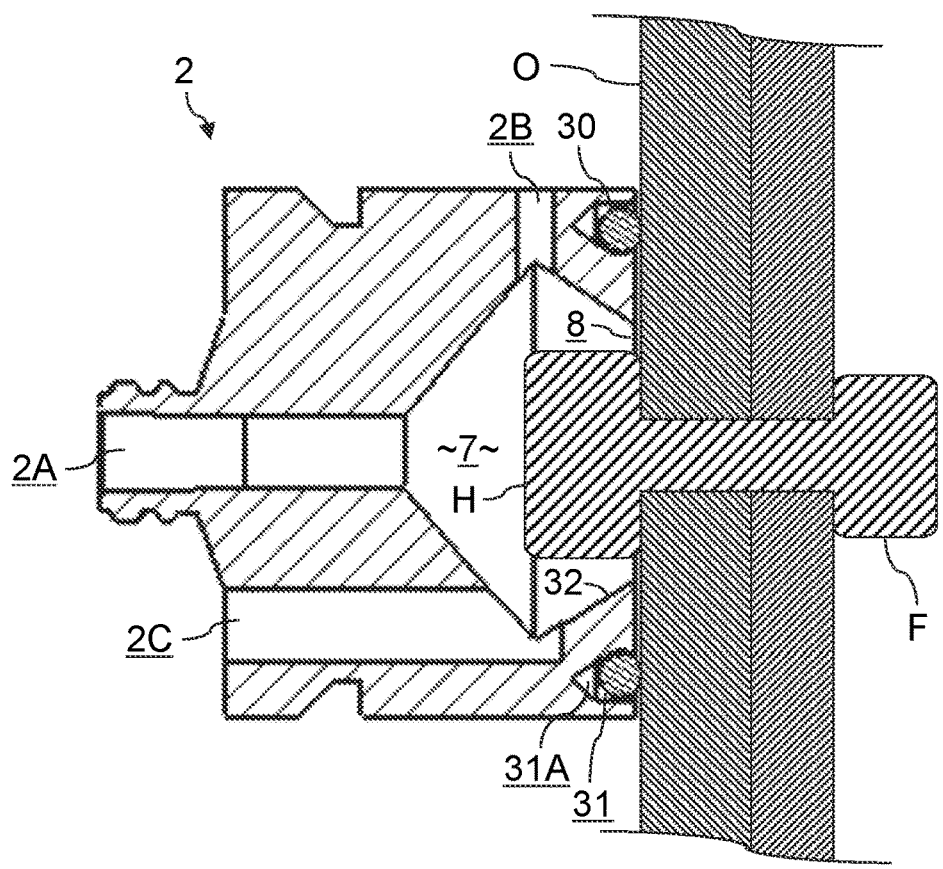
FIG. 6 is a longitudinal sectional view showing the second example of structure of the cup shown in FIGS. 1 to 3.
Figure 7:
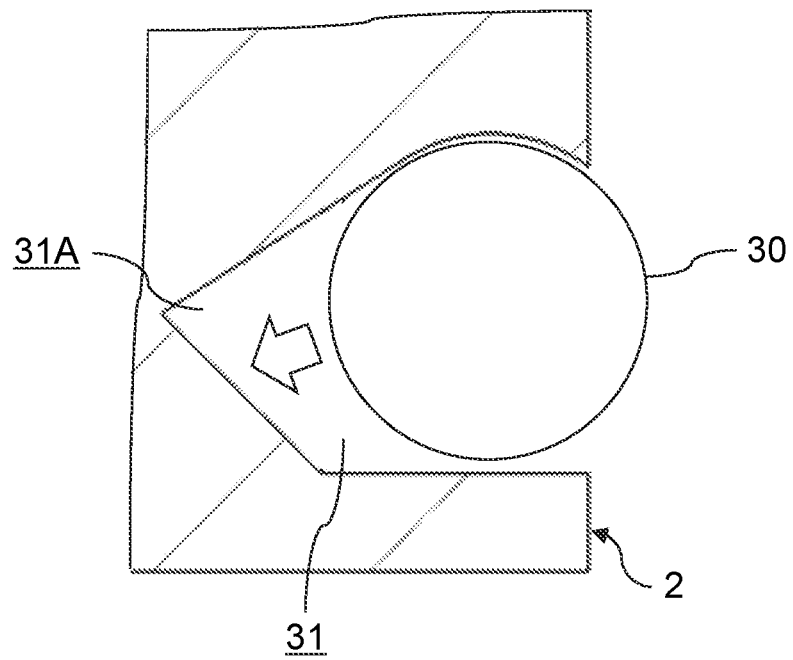
FIG. 7 is a partial enlarged view of an O ring and a groove for the O ring shown in FIG. 6.
Figure 8:
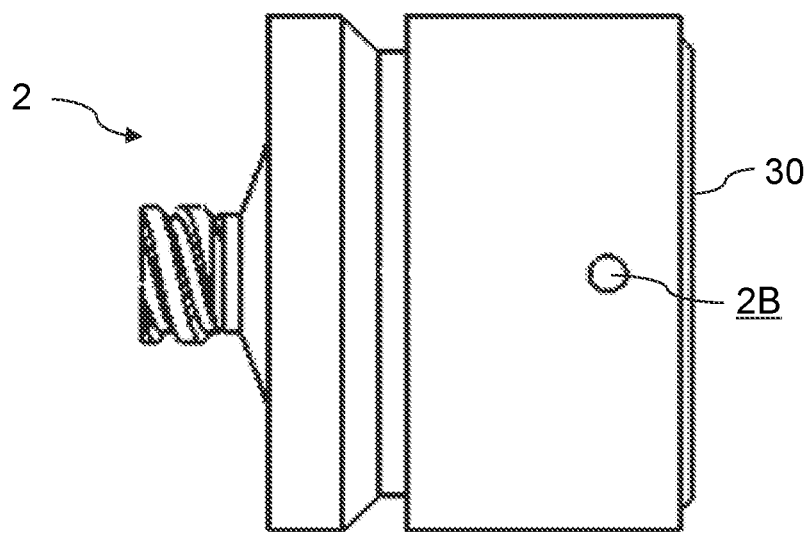
FIG. 8 is a top view of the cup shown in FIG. 6.

FIG. 6 is a longitudinal sectional view showing the second example of structure of the cup 2 shown in FIGS. 1 to 3. FIG. 7 is a partial enlarged view of an O ring 30 and a groove 31 for the O ring 30 shown in FIG. 6. FIG. 8 is a top view of the cup 2 shown in FIG. 6.

As the second example of structure exemplified by FIG. 6 to FIG. 8, the depth of the groove 31 for disposing the O ring 30 can be made not less than the diameter in the cross section of the O ring 30 so that the crushed O ring 30 may not project from the edge of the cup 2 even when the O ring 30 is pressed to the surface of the object O. In other words, a back clearance 31A can be formed on the bottom of the groove 31 for disposing the O ring 30.

In this case, the crushed O ring 30 is entirely pushed into the groove 31 when the O ring 30 is pressed to the surface of the object O. Therefore, a gap due to the O ring 30 can be prevented from arising between the cup 2 and the surface of the object O while the O ring 30 can be kept to be closely attached to the surface of the object O by the elastic force of the crushed O ring 30 after the O ring 30 has been pressed on the surface of the object O. As a result inconvenience that the surplus paint EP flows down after the paint application has been completed and the cup 2 has been retracted can be avoided.

In addition, in the second example of structure, the cavity 7 of the cup 2 is formed by a wall surface 32 slanted so that the flow of air and the movement of the surplus paint EP may become ideal. Specifically, the wall surface 32 of the cavity 7 is tapered so that the height of the upper part of the cavity 7 may become low gradually toward the opening 8 of the cup 2. Meanwhile, the wall surface 32 of the cavity 7 is tapered so that the height of the lower part of the cavity 7 may become high gradually toward the opening 8 of the cup 2.

More specifically, the wall surface 32 of the cavity 7 is slanted so that the lowest portion of the cavity 7 may become lower than the lowest portion of the opening 8 in the state where the normal direction of the plane on which the edge of the cup 2 lies is made horizontal. Meanwhile, the wall surface 32 of the cavity 7 is slanted so that the highest portion of the cavity 7 may become higher than the highest portion of the opening 8 in the state where the normal direction of the plane on which the edge of the cup 2 lies is made horizontal.

In this case, an annular valley whose cross section is V-shaped can be formed in the cavity 7. Thereby, the wall surface 32 of the cavity 7 can be tapered so that the whole cavity 7 may become narrow gradually toward the opening 8. In such a case, the wall surface 32 has a form same as that of the side face of a truncated cone. That is, the structure of the cup 2 can be simplified. Therefore, it becomes easy to design and produce the cup 2.

When the wall surface 32 of the cavity 7 is slanted as described above, the air remaining in the cavity 7 of the cup 2 can be led to the topmost vent 2B more certainly while the paint P is being discharged into the cavity 7. As a result, the air can be prevented from remaining in the cavity 7 of the cup 2 more certainly after the cavity 7 of the cup 2 has been filled up with the paint P.

On the other hand, when the surplus paint EP is discharged out of the cavity 7 of the cup 2, the surplus paint EP can be led to the lowermost liquid discharging port 2C more certainly. As a result, the surplus paint EP can be prevented from remaining in the cavity 7 of the cup 2 more certainly after the discharging process of the surplus paint EP out of the cavity 7 of the cup 2 has been completed. In addition, inconvenience that the surplus paint EP flows down from the opening 8 of the cup 2 after the paint application has been completed and the cup 2 has been retracted can be avoided. Accordingly, the effect that the consumption of the paint P is reduced can be also attained.

Figure 9:
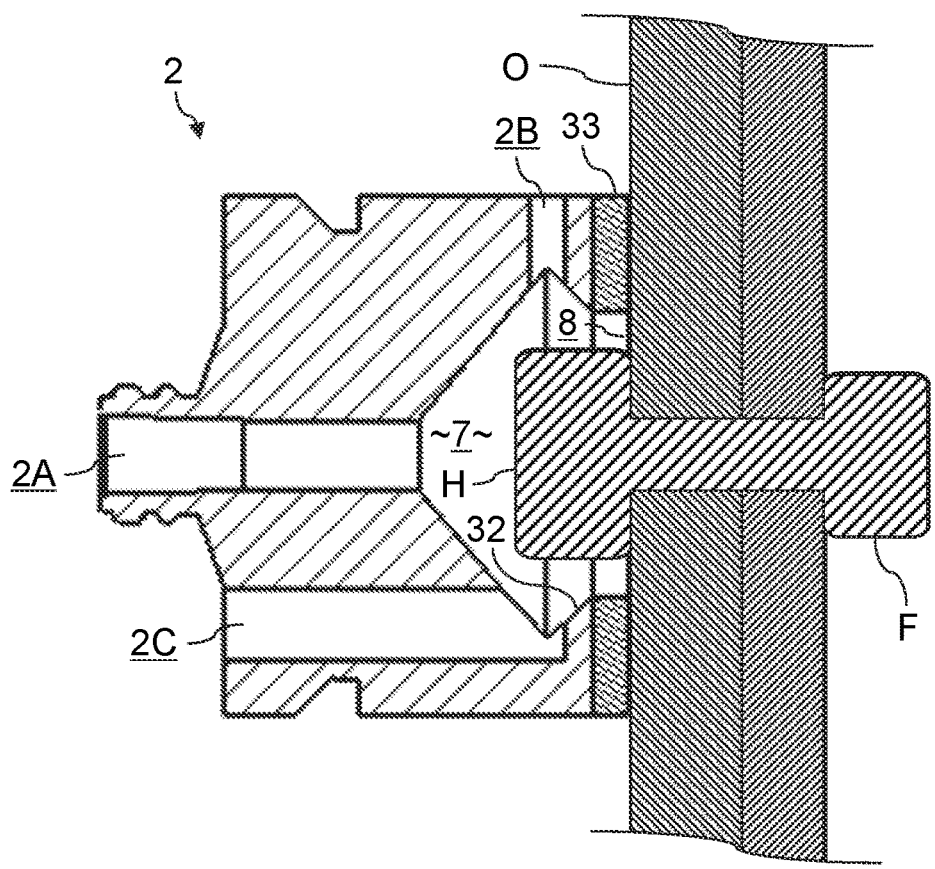
FIG. 9 is a longitudinal sectional view showing the third example of structure of the cup shown in FIGS. 1 to 3.
Figure 10:
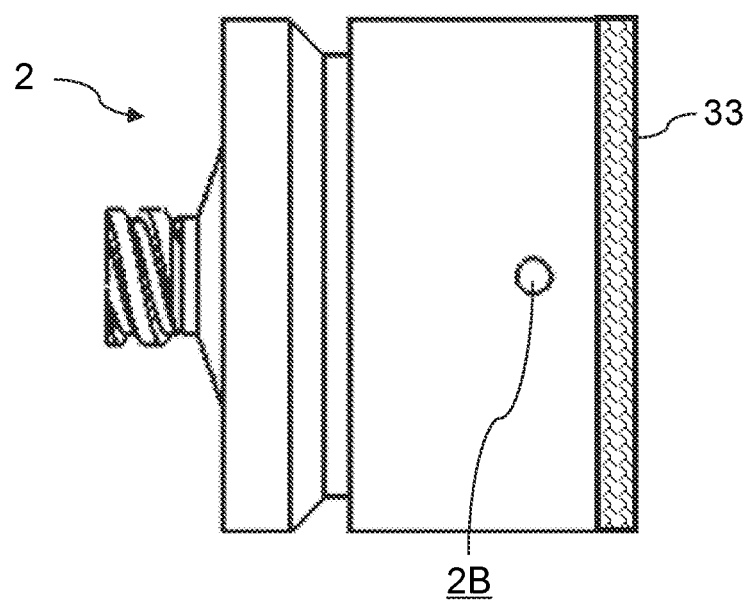
FIG. 10 is a top view of the cup shown in FIG. 9.

FIG. 9 is a longitudinal sectional view showing the third example of structure of the cup 2 shown in FIGS. 1 to 3. FIG. 10 is a top view of the cup 2 shown in FIG. 9.

As the third example of structure exemplified by FIG. 9 and FIG. 10, a ring-shaped elastic sponge 33 can be attached to the edge of the cup 2 as a packing instead of the O ring 30. That is, the edge of the cup 2 can be formed by the sponge 33. The sponge 33 can be made of a desired porous material, such as a foamed rubber.

In particular, a sponge washer with double-stick tape has been marketed, and the sponge 33 can be easily stuck on the edge of the cup 2 with the tape. Therefore, third example of structure does not require the groove 31 for embedding the O ring 30 like the first and second examples of structure. As a result, the supply port 2A and the liquid discharging port 2C can be disposed close to the opening 8 compared with a case of using the O ring 30.

In this case, the volume of the cavity 7 can be made small as well as the surplus paint EP can be prevented from flowing down from the opening 8 of the cup 2 after the cup 2 has been retracted while the surplus paint EP can be led to the liquid discharging port 2C easily to be discharged and collected. Accordingly, the surplus paint EP and the consumption of the paint P can be reduced compared with a case of using the O ring 30.

Furthermore, the sponge 33 easily deforms according to the form of the surface of the object O by the collapse of minute holes unlike the typical O ring 30. Accordingly, the sponge 33 can be closely attached to the surface of the object O even when the edge of the cup 2 is not pressed on the surface of the object O strictly vertically.

In addition, the sponge 33 has absorbability for liquid. Therefore, even when the surplus paint EP flows between the surface of the object O and the edge of the cup 2 on which the sponge 33 has been stuck, the surplus paint EP can be absorbed by the sponge 33. That is, when the cup 2 is pulled apart from the surface of the object O after the paint application has been completed, the sponge 33 absorbs the surplus paint EP into the inside minute holes while returning to the original form. Therefore, even when the edge of the cup 2 was not strictly vertically pressed on the surface of the object O and thereby the surplus paint EP flowed in the vicinity of the sponge 33, the surplus paint EP can be prevented from inconveniently flowing down after the cup 2 has been retracted.

That is, the sponge 33 functions as a packing for preventing the leakage of the paint P during the discharge of the paint P into the cavity 7 of the cup 2 while the sponge 33 functions as an absorber which absorbs the surplus paint EP to prevent from flowing down after the paint application has been completed.

The normal direction of the surface of the object O is not always strictly horizontal, and the surface of the object O may not be flat but a curved surface whose curvature is small, or may consist of flat faces whose normal directions are slightly different from each other. For that reason, the normal direction of the plane on which the edge of the cup 2 lies may be inclined to a horizontal direction within a range of zero degrees to 45 degrees according to the position and form of the surface of the object O at the time of actual paint application regardless of which of the cups 2 having the first to third examples of structure is used.

In particular, it has been confirmed by tests using prototypes that using the cup 2 having the third example of structure can prevent the leakage of the paint P most satisfactorily during the discharge of the paint P into the cavity 7 of the cup 2 as well as can prevent the surplus paint EP from inconveniently flowing down most satisfactorily after the paint application has been completed and the cup 2 has been retracted, in case of inclining the cup 2.

(Method of Painting Fastener)

Next, a method of painting a fastener under which a painted product is produced by painting the head H of the fastener F attached to the object O using the fastener painting system 1 will be described.

Figure 11:
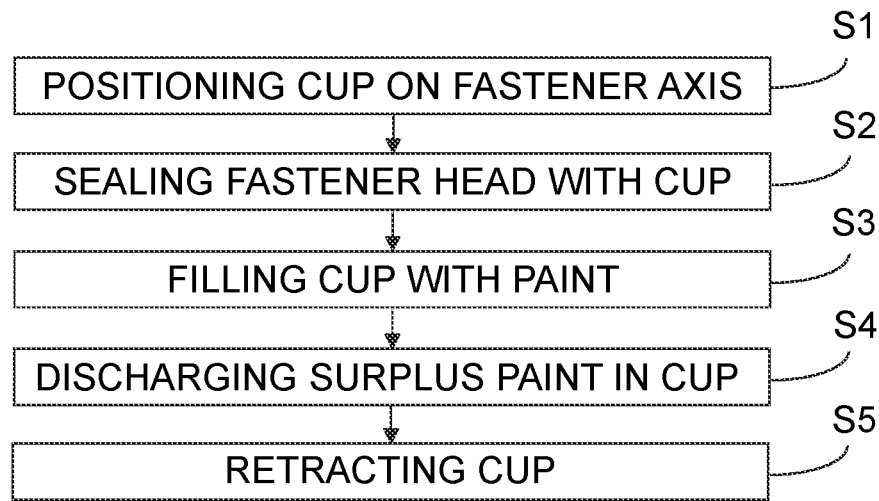
FIG. 11 is a flow chart showing a flow for painting the head of the fastener using the fastener painting system exemplified by FIG. 1.

FIG. 11 is a flow chart showing a flow for painting the head H of the fastener F using the fastener painting system 1 exemplified by FIG. 1.

Firstly, in Step S1, the cup 2 is positioned in directions vertical to the length direction of the fastener F for disposing the cup 2 on the axis line of the fastener F. Specifically, control programs, including positional information on the fasteners F, stored in the storage 6B is read into the controller 6A, and the moving mechanism 6 drives under the control by the controller 6A so that the center position of the opening 8 of the cup 2 and the center axis of the fastener F may substantially lie on a same straight line. When the moving mechanism 6 is the articulated robot 20 as exemplified by FIG. 2, the arm 21 drives under the control by the robot controller 26.

Thereby, the relative position of the cup 2 and the object O changes, and the cup 2 is positioned at a position away from the head H of the fastener F in the length direction of the fastener F in the state where the opening 8 of the cup 2 has been faced to the head H of the fastener F.

Next, in Step S2, the cup 2 is positioned in the length direction of the fastener F for sealing the head H of the fastener F with the cup 2. Specifically, the controller 6A controls the moving mechanism 6 based on the control programs including the positional information on the fasteners F so that the edge of the cup 2 may contact with the surface of the object O. Therefore, the moving mechanism 6 drives and thereby the cup 2 moves in parallel in the length direction of the fastener F. As a result, the edge of the cup 2 gradually approaches the surface of the object O, and finally contact with the surface of the object O.

When the edge of the cup 2 has contacted with the surface of the object O, the edge of the cup 2 receives reaction force from the surface of the object O. Accordingly, when the moving mechanism 6 is the articulated robot 20 having the force sensors 25 as exemplified by FIG. 2, the reaction force from the surface of the object O is detected with the force sensors 25. The detection of the reaction force is notified from the force sensors 25 to the robot controller 26. Thereby, the robot controller 26 can detect that the edge of the cup 2 has contacted with the surface of the object O, and can stop the driving of the arm 21.

When the cup 2 has been positioned in the length direction of the fastener F, the packing, such as the O ring 30 or the sponge 33, attached to the edge of the cup 2 is closely attached to the surface of the object O, and thereby the head H of the fastener F is covered with the cup 2. That is, the circumference of the head H of the fastener F is sealed with the cup 2.

Next, in Step S3, the inside of the cup 2 is filled up with the paint P. Specifically, a trigger signal for operating the dispenser 11 is output from the controller 6A to the dispenser 11. Accordingly, the dispenser 11 operates and air is supplied into the syringe 9. Thereby, the plunger 10 in the syringe 9 is pushed by air pressure, and the paint P in the syringe 9 is discharged from the tip of the syringe 9 toward the supply port 2A of the cup 2. The paint P discharged out of the syringe 9 is supplied into the cavity 7 through the supply port 2A of the cup 2.

Since the cavity 7 in the cup 2 is a space closed by the surface of the object O, the pressure of air in the cavity 7 rises as the paint P flows into the cavity 7. Accordingly, the air in the cavity 7 is discharged through the vent 2B. In other words, the air in the cavity 7 inside the cup 2 is pushed out through the vent 2B by the paint P whose liquid level gradually goes up in the cavity 7.

The air which has flowed into the vent 2B is discharged out to the atmosphere through the air tube 13 and the valve 14. Therefore, the pressure of the air in the cavity 7 only rises up to a certain extent, and the discharge of the paint P into the cavity 7 can be continued. That is, the paint P is supplied into the cavity 7 while the air in the cavity 7 is being discharged out through the vent 2B.

The quantity of the paint P supplied into the cavity 7 is slightly more than the capacity of the space in the cup 2 closed by the surface of the object O. Therefore, the air in the cavity 7 can be entirely discharged through the vent 2B while the cavity 7 can be entirely filled with the paint P. As a result, the paint P can be attached all over the head H of the fastener F.

Although a part of the paint P flows into the vent 2B and may also flow into the air tube 13, the paint P does not overflow outside through the valve 14 since the total quantity of the paint P to be discharged has been determined so that the paint P may stop within the air tube 13. That is, the dispenser 11 is controlled so that the dispenser 11 may stop at the timing at which the paint P of a quantity, more than the capacity of the cavity 7 in the cup 2, which does not overflow from the valve 14, has been discharged into the cavity 7.

Next, in Step S4, the surplus paint EP in the cavity 7 of the cup 2 is discharged through the liquid discharging port 2C. Specifically, when the inside of the cup 2 has been filled up with the paint P and a predetermined waiting period has passed, the surplus paint EP in the cavity 7 of the cup 2 is sucked by the operation of the vacuum device 15.

More specifically, a trigger signal for operating the vacuum device 15 is output from the controller 6A to the vacuum device 15. Accordingly, the vacuum device 15 operates, and the air is sucked from the layer of the air in the discharged liquid trap 16 through the air tube 18. Thereby, the pressure of the layer of the air in the discharged liquid trap 16 becomes negative, and the liquid level of the surplus paint EP in the discharged liquid trap 16 goes up. As a result, the surplus paint EP is sucked and collected from the cavity 7 of the cup 2 and the inside of the air tube 13 into the discharged liquid trap 16 through the liquid discharging port 2C and the liquid discharging tube 17.

During the suction of the surplus paint EP, the valve 14, such as a check valve, coupled to the end on the atmosphere side of the air tube 13 is closed. Therefore, the air does not flow backwards inside the air tube 13, and the cavity 7 of the cup 2 is sealed. As a result, it becomes possible to suck the surplus paint EP satisfactorily.

Next, in Step S5, the cup 2 is moved to a retracted position. Specifically, the moving mechanism 6, such as the articulated robot 20, drives under the control by the controller 6A, such as the robot controller 26, and the cup 2 is pulled apart from the surface of the object O. Thereby, local paint application, i.e., touch-up of the head H of the fastener F is completed.

Then, when there remains another fastener F whose head H should be painted, the operations and the like from Step S1 to Step S5 are repeated again until all the heads H of the fasteners F are painted. Thereby, a painted product consisting of the object O of which the heads H of the fasteners F have been painted can be produced.

(Effects)

The above-mentioned fastener painting system 1 and method of painting a fastener hold the cup 2, having the airtightness, which can cover the head H of the fastener F, by the moving mechanism 6, such as the articulated robot 20, fill up the cup 2 with the paint P by the supply system 3 composed of the syringe 9, the dispenser 11 and the like, and subsequently discharge the surplus paint EP out of the cup 2 by the liquid discharging system 5 composed of the vacuum device 15 and the like.

Accordingly, the fastener painting system 1 and the method of painting a fastener allow automating paint application of the head H of the fastener F. As a result, the labor and working hours for painting the head H of the fastener F can be reduced compared with manual paint application by a worker.

In particular, appropriately setting up painting conditions including discharging conditions of the paint P supplied into the cup 2, a waiting time after filling up the cup 2 with the paint P till discharging the surplus paint EP, and the discharging pressure of the surplus paint EP makes it possible to reduce and equalize the variation in painting quality compared with manual paint application by a worker as well as adjust the film thickness of the paint P after paint application.

Moreover, safety can also be improved compared with manual paint application by a worker since the frequency that an operator of the fastener painting system 1 treats the paint P decreases.

(Second Implementation)

Figure 12:
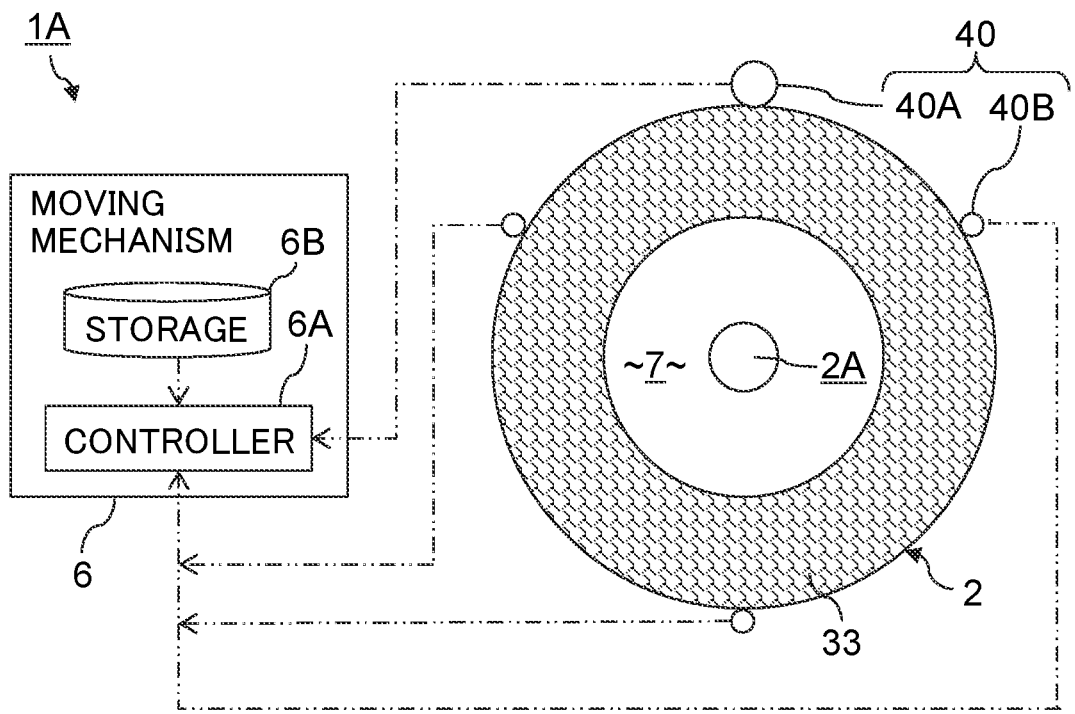
FIG. 12 shows an example of configuration of the control device of the moving mechanism and the cup included in a fastener painting system according to the second implementation of the present invention.

FIG. 12 shows an example of configuration of the controller 6A of the moving mechanism 6 and the cup 2 included in a fastener painting system 1A according to the second implementation of the present invention.

The fastener painting system 1A in the second implementation shown in FIG. 12 is different from the fastener painting system 1 in the first implementation in a configuration that the position of the cup 2 relative to the head H of the fastener F can be corrected based on information acquired by at least one sensor 40. Other configurations and actions of the fastener painting system 1A in the second implementation are not substantially different from those of the fastener painting system 1 in the first implementation. Accordingly, only the cup 2 and the controller 6A of the moving mechanism 6 are illustrated for showing an example of disposition of the sensors 40, and the same reference numbers are attached to the same or corresponding elements while explanation thereof is omitted. Note that, the form of the cup 2 as viewed from the opening 8 side is illustrated in FIG. 12.

In particular, in case of the articulated robot 20 having cantilever structure, the cup 2 may be unable to be positioned with sufficient accuracy by the positioning accuracy of the arm 21. Moreover, also when the error in the fixed position of the object O and the cup 2 is large, the cup 2 may be unable to be positioned with sufficient accuracy.

Accordingly, the position of the cup 2 relative to the head H of the fastener F can be corrected utilizing the sensor 40 or the sensors 40. Practical examples of the sensors 40 for positional correction include an optical camera 40A and distance sensors 40B. Using the optical camera 40A allows photographing the head H of the fastener F to acquire image data, and thereby the outline of the head H of the fastener F can be extracted by image recognition processing of the acquired image data as well as the center position of the head H of the fastener F can be two-dimensionally calculated based on the extracted outline of the head H of the fastener F.

On the other hand, using the three or more distance sensors 40B allows calculating the 3D position of a subject in principle by measuring the distance from each of the distance sensors 40B to the subject. Alternatively, using the two or more optical cameras 40A to acquire two frames of image data in which the head H of the fastener F shows up allows calculating the 3D position of the head H of the fastener F including the distance to the head H of the fastener F geometrically based on a difference between the frames.

When the outline and the 2D position of the center of the head H of the fastener F can be detected, the 2D position of the cup 2 can be corrected on a plane vertical to the length direction of the fastener F so that the center position of the opening 8 of the cup 2 and the center position of the head H of the fastener F may lie on a same straight line parallel to the length direction of the fastener F.

On the other hand, when the outline and the 3D position of the center of the head H of the fastener F can be detected, the direction of the cup 2 can be also corrected in addition to the 2D position of the cup 2 on a plane vertical to the length direction of the fastener F. Specifically, the direction of the cup 2 can be corrected so that the plane on which the edge of the cup 2 lies may become parallel to the surface of the object O.

Accordingly, the sensors 40 of the number and at least one type according to a targeted positioning accuracy of the cup 2 can be disposed at appropriate positions so that the position of the cup 2 can be corrected. As long as the head H of the fastener F is within a field of view of each of the sensors 40, measured data can be coordinate-converted. Therefore, each of the sensors 40 may be disposed at a desired portion of the moving mechanism 6, such as the arm 21 or the end effector 23 of the articulated robot 20, which does not move relatively to the cup 2, or may be disposed at a desired portion, which does not move relatively to the cup 2, outside the moving mechanism 6.

In the example shown in FIG. 12, the single optical camera 40A and the equally spaced three distance sensors 40B are attached to the outer peripheral surface of the cup 2 of which the sponge 33 is stuck as a packing on the edge. Accordingly, the 3D position including the direction of the cup 2 can be corrected. More specifically, the 3D position including the direction of the cup 2 can be corrected by two-dimensionally calculating the center position of the head H of the fastener F based on an image of the head H of the fastener F acquired by the optical camera 40A, and subsequently controlling the moving mechanism 6 by the controller 6A so that the distances from the calculated center position of the head H of the fastener F to the three distance sensors 40B may become equal to each other.

As a matter of course, when the distance sensors 40B are unequally spaced, what is necessary is to control the moving mechanism 6 by the controller 6A so that the distances from the center position of the head H of the fastener F to the distance sensors 40B may become ideal distances respectively. Moreover, the O ring 30 or another packing may be attached to the edge of the cup 2 instead of the sponge 33.

Note that, the function to acquire measured data, such as image data or distance data, from each of the sensors 40, and generate control signals of the moving mechanism 6 by data processing can be prepared in the controller 6A.

According to the second implementation as described above, the effect that the positioning accuracy of the cup 2 can be improved can be attained in addition to the same effect as that by the first implementation.

(Third Implementation)

Figure 13:
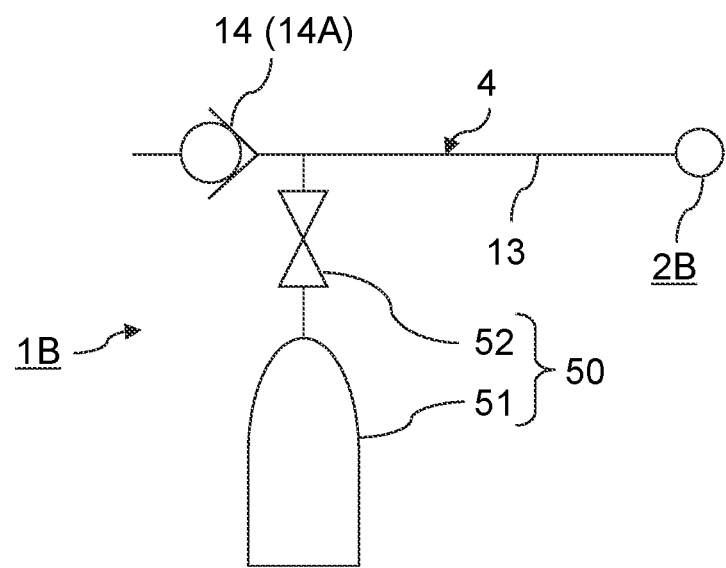
FIG. 13 shows a configuration of the exhaust system included in a fastener painting system according to the third implementation of the present invention.

FIG. 13 shows a configuration of the exhaust system 4 included in a fastener painting system 1B according to the third implementation of the present invention.

The fastener painting system 1B in the third implementation shown in FIG. 13 is different from each of the fastener painting system 1 in the first implementation and the fastener painting system 1A in the second implementation in a configuration that a compressed air supply device 50 is coupled to the end on the atmosphere side of the air tube 13 included in the exhaust system 4. Other configurations and actions of the fastener painting system 1B in the third implementation are not substantially different from those of the fastener painting system 1 in the first implementation or the fastener painting system 1A in the second implementation. Accordingly, only a configuration of the exhaust system 4 is illustrated, and the same reference numbers are attached to the same or corresponding elements while explanation thereof is omitted.

As shown in FIG. 13, while one end of the air tube 13 included in the exhaust system 4 is coupled to the vent 2B of the cup 2, the other end on the atmosphere side of the air tube 13 can be coupled to the compressed air supply device 50 in addition to the valves 14, such as the check valve 14A. the compressed air supply device 50 has a tank 51 filled with compressed air, and an opening/closing valve 52 attached to the outlet of the tank 51 so that a desired flow of compressed air can be supplied.

The opening/closing valve 52 of the compressed air supply device 50 can be opened and closed at desired timing by control signals from the controller 6A of the moving mechanism 6. Accordingly, the opening/closing valve 52 of the compressed air supply device 50 can be opened and closed interlocking with the operating state of the vacuum device 15.

When the compressed air supply device 50 is coupled to the air tube 13 for discharging air, compressed air can be made to flow into the air tube 13 during the discharge of the surplus paint EP through the liquid discharging port 2C of the cup 2. That is, while the vacuum device 15 is operating in order to suck the surplus paint EP from the inside of the cup 2, the compressed air can be supplied into the air tube 13 by opening the opening/closing valve 52 of the compressed air supply device 50. Thereby, the surplus paint EP which flowed into the air tube 13 for discharging air can be pushed out toward the liquid discharging port 2C of the cup 2 by the compressed air.

Figure 14:
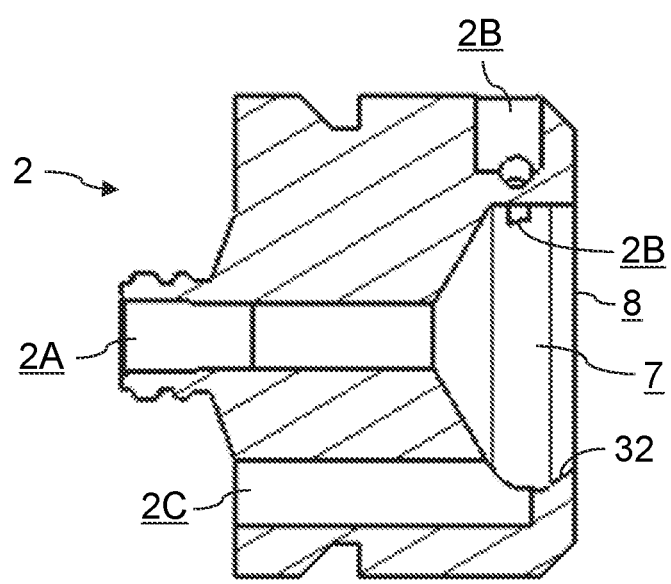
FIG. 14 is a longitudinal sectional view showing an example of structure of the cup included in the fastener painting system according to the third implementation.
Figure 15:
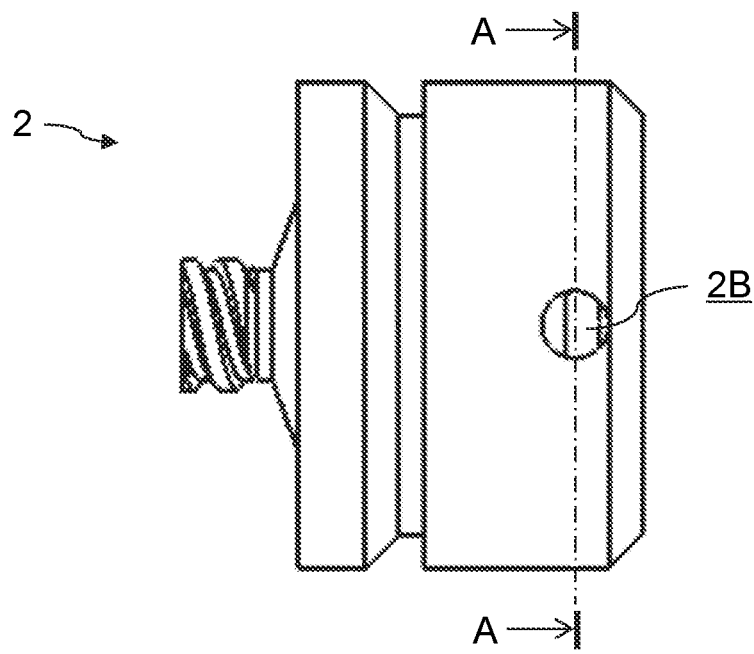
FIG. 15 is a top view of the cup shown in FIG. 14.
Figure 16:
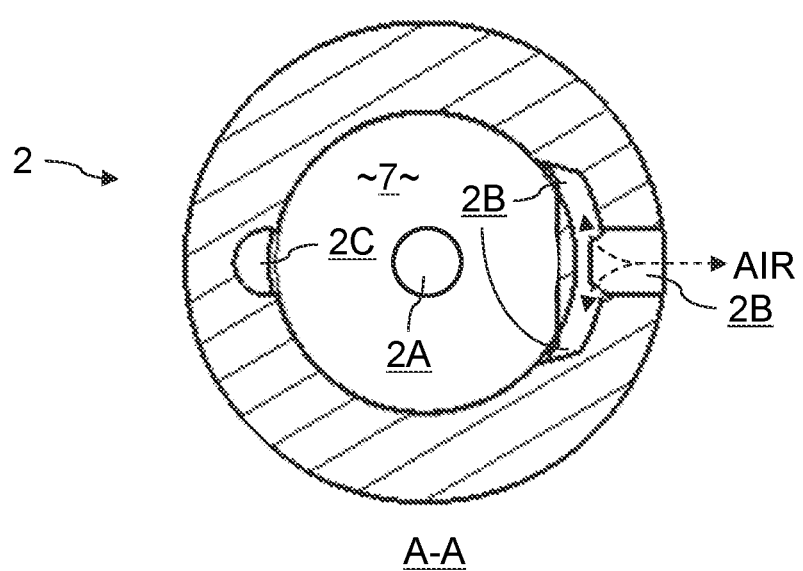
FIG. 16 is a sectional view at the position A-A of the cup shown in FIG. 15.
Figure 17:
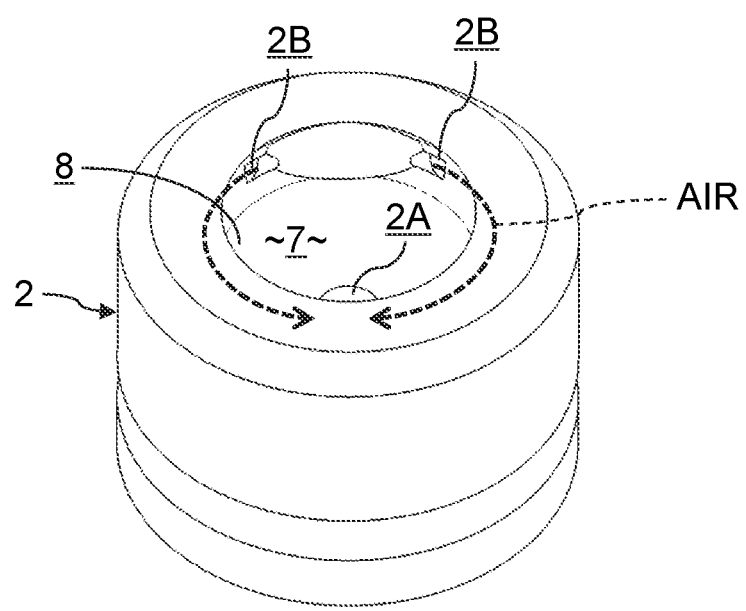
FIG. 17 is a perspective view of the cup shown in FIG. 14.

FIG. 14 is a longitudinal sectional view showing an example of structure of the cup 2 included in the fastener painting system 1B according to the third implementation. FIG. 15 is a top view of the cup 2 shown in FIG. 14. FIG. 16 is a sectional view at the position A-A of the cup 2 shown in FIG. 15. FIG. 17 is a perspective view of the cup 2 shown in FIG. 14. Note that, illustration of a packing, such as the O ring 30 or the sponge 33, attached to the edge of the cup 2 has been omitted in FIGS. 14 to 17.

When compressed air is supplied into the air tube 13 for discharging air at the time of the discharge of the surplus paint EP, the compressed air flows into the cavity 7 of the cup 2 through the air tube 13 and the vent 2B. Accordingly, the compressed air can be made to flow along the wall surface forming the cavity 7 by devising the direction of the vent 2B so that the compressed air can be prevented from blowing against the head H of the fastener F, to which the paint P has been attached, in order to avoid painting unevenness.

Specifically, the direction and form of the vent 2B can be determined as exemplified by FIG. 14 to FIG. 17 so that the streamlines of the compressed air flowing through the vent 2B opening in the cavity 7 of the cup 2 may not go to the head H of the fastener F. For that purpose, what is necessary is to determine the direction and form of the vent 2B so that tangent lines to the inner wall of the vent 2B may not go to the center of the cavity 7 at which the head H of the fastener F is disposed.

In the example shown in FIG. 14 to FIG. 17, the vent 2B is branched into two passes inside the outer wall of the cup 2, and the single vent 2B opens outside the cup 2 so that the air tube 13 can be coupled to the single vent 2B while the two vents 2B open inside the cup 2. The directions of the central axes of the two vents 2B opening inside the cup 2 are each about a tangential direction to the wall surface forming the cavity 7 in the cup 2. Accordingly, the compressed air can be made to flow along the wall surface forming the cavity 7 in the cup 2, as exemplified by FIG. 17. As a result, painting unevenness resulting from the supply of the compressed air can be prevented from being generated.

According to the third implementation as described above, the effect that the surplus paint EP which has flowed into the air tube 13 for discharging air can be discharged satisfactorily can be attained in addition to the same effect as that by the first or second implementation.

OTHER IMPLEMENTATIONS

While certain implementations have been described, these implementations have been presented by way of example only, and are not intended to limit the scope of the invention. Indeed, the novel methods and systems described herein may be embodied in a variety of other forms; furthermore, various omissions, substitutions and changes in the form of the methods and systems described herein may be made without departing from the spirit of the invention. The accompanying claims and their equivalents are intended to cover such forms or modifications as would fall within the scope and spirit of the invention.

What is claimed is:

1. A fastener painting system for painting a head of a fastener, the fastener painting system comprising:
   a cup for covering the head of the fastener by contacting an edge of the cup with a surface of an object, the cup having a cavity for being filled up with paint;
   a supply system configured to store the paint and supply the paint into the cavity of the cup, the supply system having a syringe;
   a liquid discharging system configured to discharge surplus paint in the cavity out of the cup, the liquid discharging system having a vacuum pump or an ejector; and
   a moving mechanism configured to change a position of the cup relative to the object, the moving mechanism having an articulated robot or at least one drive shaft;
   wherein the cup has:

a supply port for supplying the paint into the cavity;
a vent for discharging air in the cavity out; and
a liquid discharging port for discharging the surplus paint out of the cavity.

2. The fastener painting system according to claim 1, wherein a flexible ring-shaped sponge is attached to the edge of the cup.

3. The fastener painting system according to claim 1, wherein a position at which the vent opens in the cavity of the cup becomes highest in the cavity while a position at which the liquid discharging port opens in the cavity of the cup becomes lowest in the cavity when a normal direction of a plane on which the edge of the cup lies is horizontal.

4. The fastener painting system according to claim 1, wherein the cup has a first wall surface and a second wall surface each forming the cavity, the first wall surface being slanted so that a lowermost part of the cavity becomes lower than a lowermost part of an opening of the cup when a normal direction of a plane on which the edge of the cup lies is horizontal, the second wall surface being slanted so that an uppermost part of the cavity becomes higher than an uppermost part of the opening when the normal direction of the plane is horizontal.

5. A method of painting the fastener with the fastener painting system of claim 1, the method comprising:
covering the head of the fastener with the cup by changing the position of the cup relative to the object by the moving mechanism and contacting the edge of the cup with the surface of the object;
supplying the paint into the cavity through the supply port while discharging the air in the cavity out through the vent; and
discharging the surplus paint in the cavity out through the liquid discharging port.

6. The fastener painting system according to claim 2, wherein a position at which the vent opens in the cavity of the cup becomes highest in the cavity while a position at which the liquid discharging port opens in the cavity of the cup becomes lowest in the cavity when a normal direction of a plane on which the edge of the cup lies is horizontal.

7. The fastener painting system according to claim 2, wherein the cup has a first wall surface and a second wall surface each forming the cavity, the first wall surface being slanted so that a lowermost part of the cavity becomes lower than a lowermost part of an opening of the cup when a normal direction of a plane on which the edge of the cup lies is horizontal, the second wall surface being slanted so that an uppermost part of the cavity becomes higher than an uppermost part of the opening when the normal direction of the plane is horizontal.

8. The fastener painting system according to claim 3, wherein the cup has a first wall surface and a second wall surface each forming the cavity, the first wall surface being slanted so that a lowermost part of the cavity becomes lower than a lowermost part of an opening of the cup when the normal direction of the plane is horizontal, the second wall surface being slanted so that an uppermost part of the cavity becomes higher than an uppermost part of the opening when the normal direction of the plane is horizontal.

9. The fastener painting system according to claim 6, wherein the cup has a first wall surface and a second wall surface each forming the cavity, the first wall surface being slanted so that a lowermost part of the cavity becomes lower than a lowermost part of an opening of the cup when the normal direction of the plane is horizontal, the second wall surface being slanted so that an uppermost part of the cavity becomes higher than an uppermost part of the opening when the normal direction of the plane is horizontal.

10. The method according to claim 5, wherein a flexible ring-shaped sponge is attached to the edge of the cup.

11. The method according to claim 5, wherein a position at which the vent opens in the cavity of the cup becomes highest in the cavity while a position at which the liquid discharging port opens in the cavity of the cup becomes lowest in the cavity when a normal direction of a plane on which the edge of the cup lies is horizontal.

12. The method according to claim 5, wherein the cup has a first wall surface and a second wall surface each forming the cavity, the first wall surface being slanted so that a lowermost part of the cavity becomes lower than a lowermost part of an opening of the cup when a normal direction of a plane on which the edge of the cup lies is horizontal, the second wall surface being slanted so that an uppermost part of the cavity becomes higher than an uppermost part of the opening when the normal direction of the plane is horizontal.

13. The method according to claim 10, wherein a position at which the vent opens in the cavity of the cup becomes highest in the cavity while a position at which the liquid discharging port opens in the cavity of the cup becomes lowest in the cavity when a normal direction of a plane on which the edge of the cup lies is horizontal.

14. The method according to claim 10, wherein the cup has a first wall surface and a second wall surface each forming the cavity, the first wall surface being slanted so that a lowermost part of the cavity becomes lower than a lowermost part of an opening of the cup when a normal direction of a plane on which the edge of the cup lies is horizontal, the second wall surface being slanted so that an uppermost part of the cavity becomes higher than an uppermost part of the opening when the normal direction of the plane is horizontal.

15. The method according to claim 11, wherein the cup has a first wall surface and a second wall surface each forming the cavity, the first wall surface being slanted so that a lowermost part of the cavity becomes lower than a lowermost part of an opening of the cup when the normal direction of the plane is horizontal, the second wall surface being slanted so that an uppermost part of the cavity becomes higher than an uppermost part of the opening when the normal direction of the plane is horizontal.

16. The method according to claim 13, wherein the cup has a first wall surface and a second wall surface each forming the cavity, the first wall surface being slanted so that a lowermost part of the cavity becomes lower than a lowermost part of an opening of the cup when the normal direction of the plane is horizontal, the second wall surface being slanted so that an uppermost part of the cavity becomes higher than an uppermost part of the opening when the normal direction of the plane is horizontal.

\* \* \* \* \*